April 24, 1928.
H. J. WRIGHT ET AL
1,667,616
TRANSMISSION STAND
Filed Feb. 24, 1927
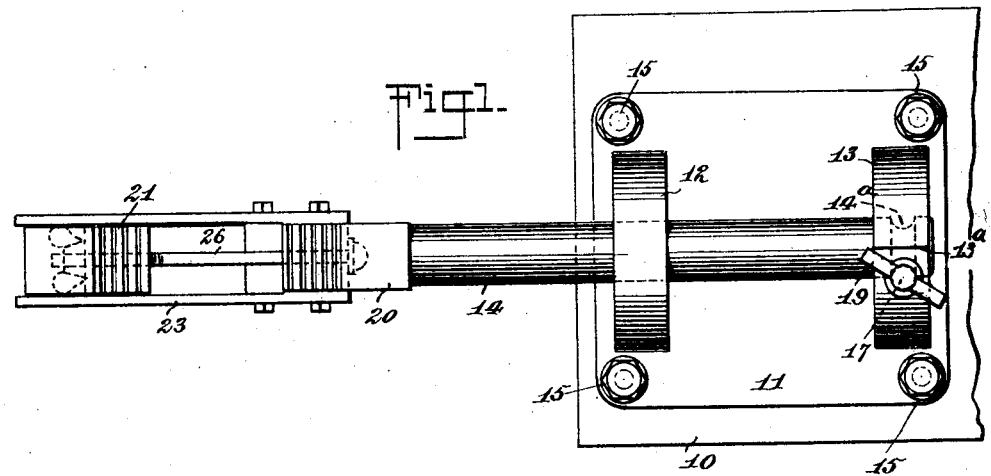
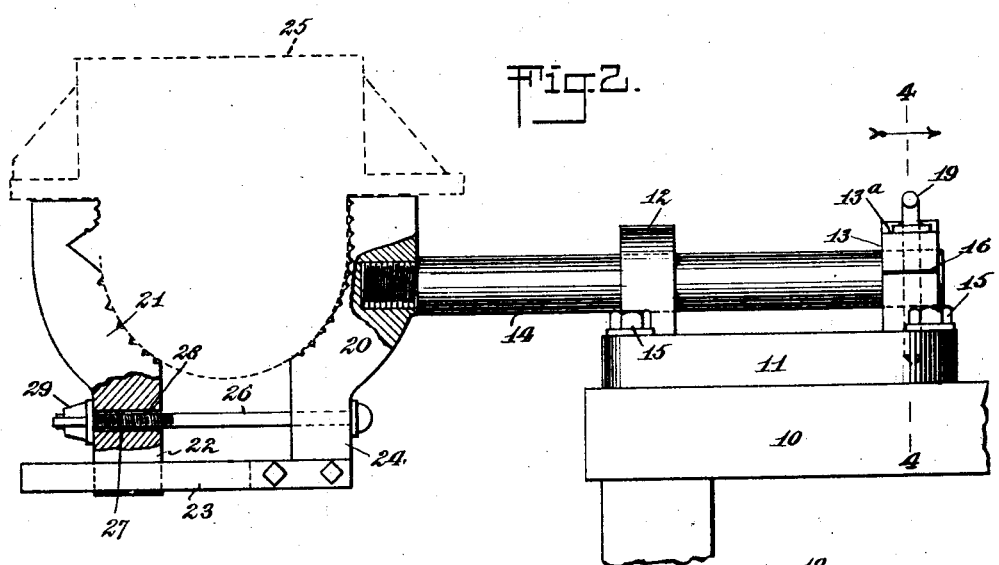
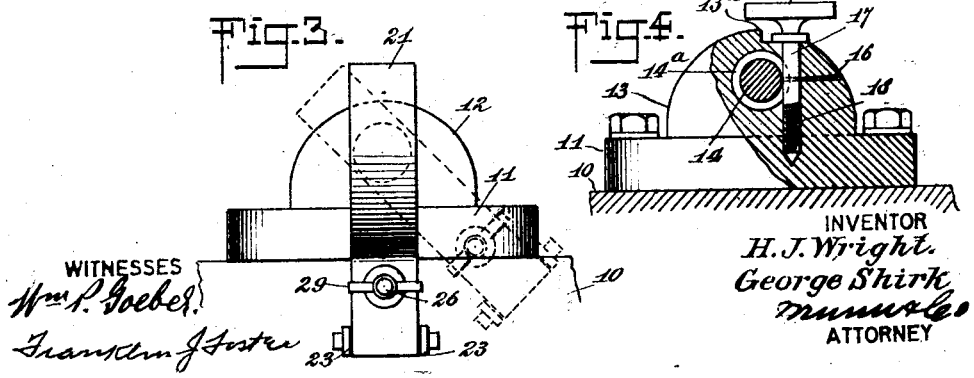
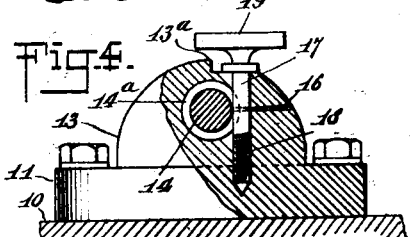
INVENTOR
H. J. Wright.
George Shirk
ATTORNEY Patented Apr. 24, 1928.

1,667,616

UNITED STATES PATENT OFFICE.

HARRY J. WRIGHT AND GEORGE SHIRK, OF WAYNESBURG, PENNSYLVANIA.

TRANSMISSION STAND.

Application filed February 24, 1927. Serial No. 170,592.

The present invention is concerned with the provision of a device which we have chosen to call a transmission stand, and which is in the nature of a tilting holder for supporting an automobile transmission case in proper position for repair.

An object of the invention is to provide a device of this nature so constructed that any conventional type of automobile transmission case may be conveniently clamped to the carrier and selectively adjusted by a tilting or rotating mechanism to dispose it at the most convenient angle for working on the case.

Other objects of the invention are to provide a transmission stand of simple, practical construction which will be rugged, durable and efficient in use, and well suited to the requirements of economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a top plan view of a transmission stand constructed in accordance with the present invention.

Fig. 2 is a side elevational view thereof showing in dotted lines a transmission case in applied position.

Fig. 3 is an end view of Fig. 2 indicating in dotted lines one of the positions to which the work-carrying jaws may be tilted.

Fig. 4 is a transverse sectional detail on the line 4—4 of Fig. 2.

In the drawings we have used the reference numeral 10 to designate a table or bench upon which is mounted a bed-plate 11 carrying a pair of aligned bearing members 12 and 13 for a shaft 14 which projects laterally over the edge of the bench. The plate 11 may be bolted to the table as at 15 if desired, and one of the bearings, preferably the bearing 13, is formed with a split 16 therein and with means for selectively closing or opening the split to lock the shaft 14 against rotation or permit free rotation thereof. We have illustrated a screw 17 operating in a socket 18 in the bearing 13, this screw having a head 19 which bears against a shoulder 13ª on the bearing and tends to close the split 16 and firmly clamp the shaft 14 against rotary movement. Preferably the screw 19 is arranged immediately adjacent the shaft, the latter being grooved at 14ª to accommodate the screw.

Mounted on the outer end of the shaft 14 and rigid therewith, is a vise-like structure including a curved jaw 20 fixed to the shaft end 14, and a generally similar jaw 21, the tail-piece 22 of which is slidably mounted on an arm 23 rigidly fixed to the tail-piece 24 of the jaw 20. These two jaws are adapted to receive and clamp in position a transmission case indicated in dotted lines at 25. For effecting relative advance of the jaws toward each other to clamp the case, we have shown a bolt 26 upon the threaded end 27 of which works a clamping screw 29. Bolt 26 is preferably fixed to the tail-piece 24 and extends freely through an opening 28 in the tail-piece 23.

In operation, shaft 14 is preferably locked against turning movement by tightening the screw 17. The transmission case 25 is then emplaced within the two jaws 21, 20, and the jaws tightened by turning the wing nut 28. With the parts in this position, the shaft 14 and the jaws which it carries may be tilted to any desired angle by slightly loosening the screw 17 and turning the shaft. In Figure 3 for instance, we have shown the jaws 21 in dotted lines at one of the angles to which they may be conveniently tilted. This construction permits the transmission case to be securely held in the most convenient position for purposes of repair.

While the jaws which we have shown are peculiarly suited for holding the transmission case of a Chevrolet car, it is to be understood that various slight changes in the jaws will adapt them for holding other types of transmission cases, and that the exact jaw construction is subject to a wide range of variations.

Obviously, various changes and alterations might be made in the general form and arrangement of the parts described without departing from the invention. Hence we do not wish to limit ourselves to the details set forth, but shall consider ourselves at liberty to make such changes and alterations as fairly fall within the spirit and scope of the appended claims.

We claim:

1. A transmission stand including a pair of relatively adjustable upwardly and outwardly curved jaws cooperatively forming a cradle, a horizontally disposed rotatably adjustable supporting shaft connected to one of the jaws near the upper end of the latter and projecting laterally therefrom, whereby the cradle is rotatably adjustable about a horizontal axis coincident with the axis of the supporting shaft.

2. A transmission stand including a pair of relatively adjustable upwardly and outwardly curved jaws cooperatively forming a cradle, a horizontally disposed rotatably adjustable supporting shaft connected to one of the jaws near the upper end of the latter and projecting laterally therefrom, whereby the cradle is rotatably adjustable about a horizontal axis coincident with the axis of the supporting shaft, the jaws including at their lower ends, depending parallel tail pieces and an extension on the tail piece of one jaw to which the tail piece of the other jaw is slidably connected.

HARRY J. WRIGHT.
GEORGE SHIRK.